(12) United States Patent
Beyerle et al.

(10) Patent No.: US 7,039,653 B2
(45) Date of Patent: May 2, 2006

(54) COMPUTER-BASED METHOD AND SYSTEM FOR GUIDING A PURCHASER TO SELECT AN APPLIANCE AND A VENTING ARRANGEMENT SUITABLE FOR THE APPLIANCE

(75) Inventors: Michael T. Beyerle, Pewee Valley, KY (US); Brian A. Brislin, Louisville, KY (US); Timothy L. O'Connell, Anchorage, KY (US)

(73) Assignee: General Electric Company, Schenectady, NY (US)

( * ) Notice: Subject to any disclaimer, the term of this patent is extended or adjusted under 35 U.S.C. 154(b) by 749 days.

(21) Appl. No.: 10/001,561

(22) Filed: Oct. 23, 2001

(65) Prior Publication Data

US 2003/0078940 A1 Apr. 24, 2003

(51) Int. Cl.
  *G06F 17/30* (2006.01)
(52) U.S. Cl. ............... 707/104.1; 707/10; 454/237; 454/370
(58) Field of Classification Search .............. 705/26; 707/104.1, 10; 454/237, 370
  See application file for complete search history.

(56) References Cited

U.S. PATENT DOCUMENTS

| | | | |
|---|---|---|---|
| 5,806,043 A | | 9/1998 | Toader |
| 5,884,315 A | | 3/1999 | Dunn |
| 5,893,082 A | * | 4/1999 | McCormick ............... 705/400 |
| 5,950,173 A | | 9/1999 | Perkowski |
| RE36,539 E | | 2/2000 | Quick |
| 6,070,149 A | * | 5/2000 | Tavor et al. ............... 705/26 |
| 6,134,557 A | * | 10/2000 | Freeman ..................... 707/102 |
| 6,147,686 A | | 11/2000 | Brown et al. |
| 6,154,738 A | | 11/2000 | Call |
| 6,167,383 A | * | 12/2000 | Henson ..................... 705/26 |

(Continued)

OTHER PUBLICATIONS

American Society of Heating, Refrigerating, and Air-Conditioning Engineers Inc., "The 1993 ASHRAE Handbook—Fundamentals," 1993, I-P Edition, American Society of Heating, Refrigerating, and Air-Conditioning Engineers Inc. pp. 32.1-40.*

(Continued)

*Primary Examiner*—Safet Metjahic
*Assistant Examiner*—Brian Goddard
(74) *Attorney, Agent, or Firm*—Enrique J. Mora; Beusse, Wolter, Sanks, Mora & Maire, P.A.

(57) ABSTRACT

Computer-based method and system for providing guidance to a purchaser for selecting an appliance that generally requires venting are provided. The guidance includes recommendations regarding a venting arrangement for the appliance. The method allows providing a database for storing appliance-related information that includes a respective identifier for each appliance. The appliance-related information further includes venting requirements data for each appliance. A vent wizard is configured to provide a set of prompts over a communications network to elicit information from the purchaser regarding a respective appliance of interest to the purchaser, and vent parameters for the venting arrangement for the appliance. The database is accessed in view of the information supplied by the purchaser. The information supplied by the purchaser is processed relative to the vent requirements data for the appliance of interest to determine a recommendation to the purchaser regarding suitability of the venting arrangement relative to the appliance of interest. The recommendation is transmitted to the purchaser so that the purchaser may take appropriate action regarding the selection of the appliance and/or venting arrangement.

15 Claims, 3 Drawing Sheets

U.S. PATENT DOCUMENTS

| | | | |
|---|---|---|---|
| 6,487,457 B1 * | 11/2002 | Hull et al. | 700/17 |
| 6,487,525 B1 * | 11/2002 | Hall et al. | 703/7 |
| 6,598,056 B1 * | 7/2003 | Hull et al. | 707/104.1 |
| 2003/0074164 A1 * | 4/2003 | Simmons et al. | 703/1 |
| 2003/0208341 A9 * | 11/2003 | Simmons et al. | 703/1 |
| 2004/0073492 A1 * | 4/2004 | Griffin | 705/26 |

OTHER PUBLICATIONS

EBuild web site as of Nov. 12, 2001 (available from the Wayback Machine (TM) service from http://web.archive.org at: http://web.archive.org/web/20011122064515/ebuild-.com/guide/ProductSpecifier.asp?CatCode=212).*

* cited by examiner

COMPUTER-BASED METHOD AND SYSTEM FOR GUIDING A PURCHASER TO SELECT AN APPLIANCE AND A VENTING ARRANGEMENT SUITABLE FOR THE APPLIANCE

BACKGROUND OF THE INVENTION

The present invention is generally related to method and system suitable for electronic-commerce (E-commerce) transactions, and, more particularly, to computer-based method and system for providing guidance to a purchaser to select an appliance that requires venting, and including recommendations regarding a venting arrangement for the appliance.

The assignee of the present invention through one of its business organizations supplies a wide range of appliances to consumers, including some appliances, such as clothes driers, range hoods, bathroom exhaust fans, etc., that generally require venting. That is, some appliances use a venting arrangement or structure to, for example, route airflow from the appliance to the exterior of the house. Thus, in some situations the venting includes directing flow of moist air from the clothes drier. In some other situations the venting includes directing flow of air with cooking residues and/or smoke resulting from food preparation. Regardless of the specific situation, it would be desirable to be able to quickly and accurately determine, prior to selecting a particular appliance and/or venting arrangement, whether an appliance of interest to the purchaser is compatible with a proposed or existing venting arrangement. It will be appreciated that such a determination would be useful to a large variety of parties, such as new home designers, remodeling designers, dealerships, retailers, sales representatives, installers, lending agencies, inspectors, landlords, homeowners, tenants, prospective buyers, etc. Thus, the term purchaser or user as used in the present invention should be broadly interpreted to include parties, such as the above-cited parties, that in one degree or another, supply and/or require services regarding the appliance, and/or the installation thereof.

Although the engineering principles for analyzing and understanding vent designs are generally well-understood in the art, present techniques for conducting such analysis are not necessarily user-friendly, particularly to non-technical users, since such techniques generally require the user to perform calculations or understand engineering tables, plots, equations and engineering terms. Thus, it would be desirable to provide techniques that, based on basic vent parameters supplied by the purchaser, are able to provide accurate and concise recommendations to the purchaser regarding suitability of the venting arrangement relative to the appliance of interest, without involving the purchaser in any computational or analytical tasks. It would be further desirable to be able to quickly and inexpensively communicate the recommendation over presently available communications networks, such as the Internet, Intranets, Wide Area Networks, Local Area Networks, Wireless Networks, etc., so that the purchaser, regardless of his or her geographical location, may take any appropriate action regarding the selection of the appliance and/or venting arrangement. It would be further desirable, once a venting arrangement has been determined to be suitable for the appliance of interest, to be able to issue a trustworthy document that certifies to interested parties of such a determination.

BRIEF SUMMARY OF THE INVENTION

Generally, the present invention fulfills the foregoing needs by providing in one aspect thereof, a computer-based method for providing guidance to a purchaser for selecting an appliance that generally requires venting. The guidance includes recommendations regarding a venting arrangement for the appliance. The method allows providing a database for storing appliance-related information that includes a respective identifier for each appliance. The appliance-related information further includes venting requirements data for each appliance. A vent wizard is configured to provide a set of prompts over a communications network to elicit information from the purchaser regarding a respective appliance of interest to the purchaser, and vent parameters for the venting arrangement for the appliance. The database is accessed in view of the information supplied by the purchaser. The information supplied by the purchaser is processed relative to the vent requirements data for the appliance of interest to determine a recommendation to the purchaser regarding suitability of the venting arrangement relative to the appliance of interest. The recommendation is transmitted to the purchaser so that the purchaser may take appropriate action regarding the selection of the appliance and/or venting arrangement.

The present invention further fulfills the foregoing needs by providing in another aspect thereof, a computer-based system for providing guidance to a purchaser for selecting an appliance that generally requires venting. The guidance includes recommendations regarding a venting arrangement for the appliance. The system includes a database for storing appliance-related information including a respective identifier for each appliance. The appliance-related information further includes venting requirements data for each appliance. A vent wizard is configured to provide a set of prompts over a communications network to elicit information from the purchaser regarding a respective appliance of interest to the purchaser, and vent parameters for the venting arrangement for the appliance. A processor is configured to access the database in view of the information supplied by the purchaser and process the information supplied by the purchaser relative to the vent requirements data for the appliance of interest. This allows determining a recommendation to the purchaser regarding suitability of the venting arrangement relative to the appliance of interest.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figures 1, 1A, 1B:
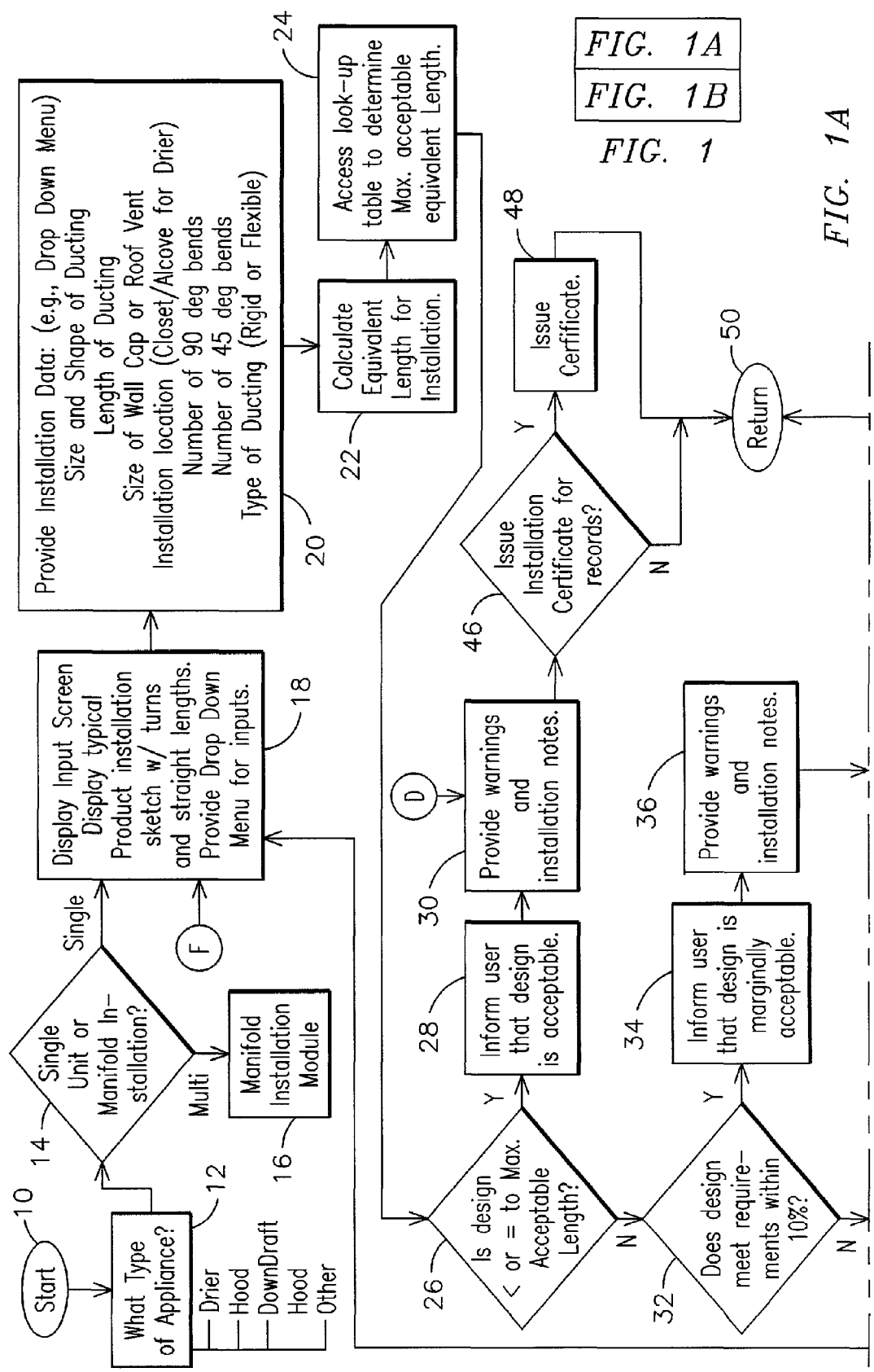
FIG. 1, made up of FIGS. 1A and 1B, is a flow diagram of exemplary actions that in accordance with aspects of the present invention allow for providing guidance to a purchaser for selecting an appliance that generally requires venting.
Figure 1B:
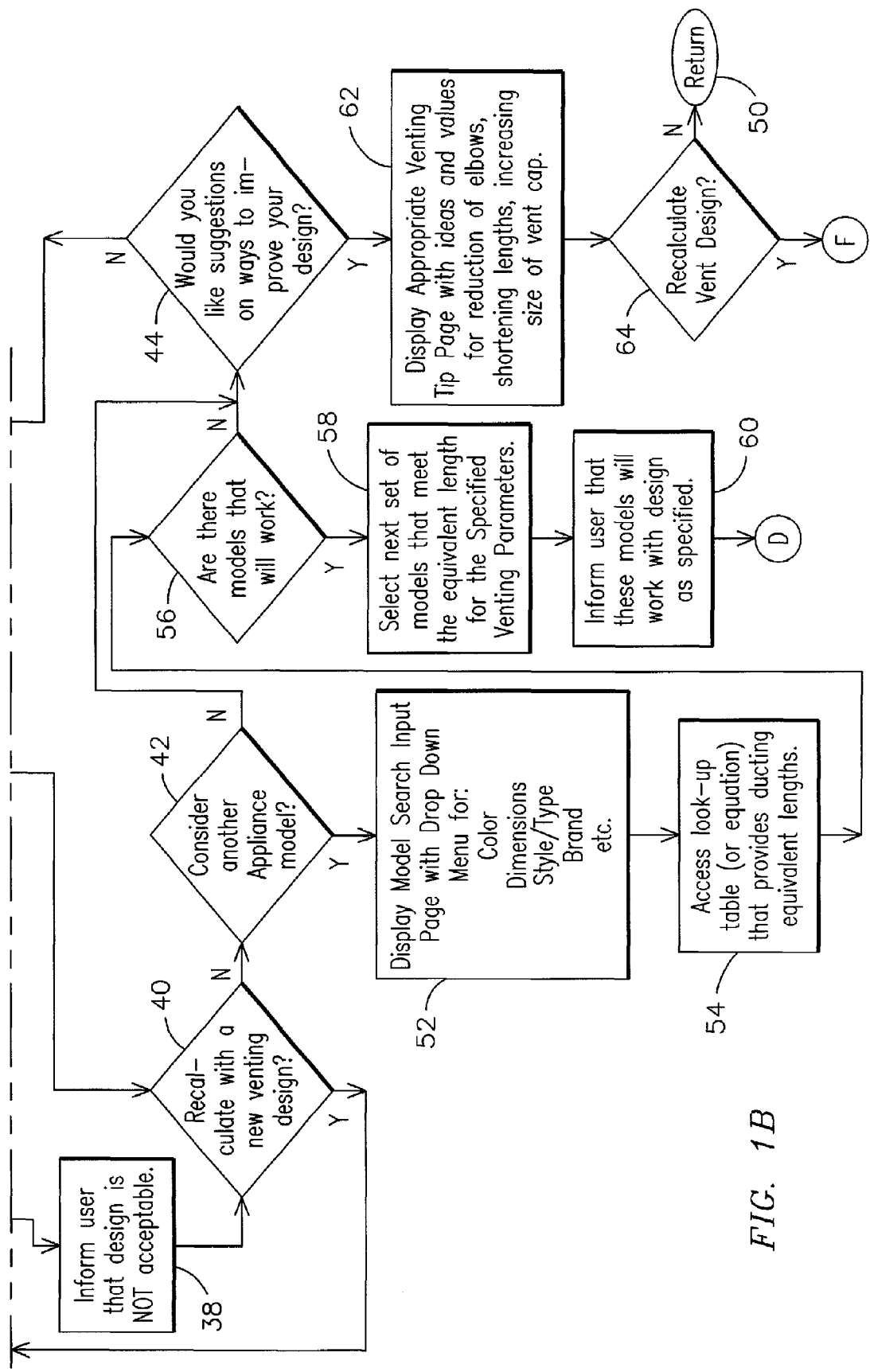

FIG. 1 is a flow diagram of exemplary actions that in accordance with aspects of the present invention allow for providing guidance to a purchaser for selecting an appliance that generally requires venting. As suggested above examples of such appliances may include clothes driers, range hoods, exhaust fans, ducting equipment, etc. Although the exemplary actions shown in the flow diagram of FIG. 1 are primarily described in the context of a clothes drier, it will be appreciated that the concepts of the present invention can be readily used for any appliance that uses a venting arrangement.

In one exemplary embodiment, the ubiquitous Internet constitutes one convenient medium for communicating and accessing a vent wizard, such as may be provided in a Web site operated and managed by the assignee of the present invention. The vent wizard is configured to provide a set of prompts over a communications network to elicit information from the purchaser regarding a particular appliance of interest to the purchaser, and vent parameters representative of the venting arrangement for the appliance. It will be appreciated, however, that the Internet is just one example of a communications network that would allow the purchaser to conveniently access the vent wizard since, as suggested above, other communication networks could be used depending on the requirements of any given application, e.g., Intranets, Wide Area Networks, Local Area Networks, Wireless Networks, Cellular Networks, etc.

Subsequent to starting step 10, at block 12 the vent wizard may prompt the purchaser to supply information regarding a respective appliance of interest to the purchaser. Once the type of appliance of interest to the purchaser is indicated, the user may be provided with a drop-down menu including a list of available models for that appliance including respective hyperlinks for accessing additional details regarding a particular model, e.g., performance capabilities, multi-media presentation, etc.

At block 14, the purchaser is prompted to indicate whether the appliance will be used in a single-family dwelling or in manifold installation, such as is generally encountered in a multi-unit installation in an apartment complex or in a commercial laundry. A manifold installation refers to the gathering of multiple vents into a common master-vent or chamber. In the event the purchaser indicates the appliance will be vented through a manifold venting arrangement, the purchaser will be directed to a manifold installation module 16. It is contemplated that the manifold installation module will be configured to account for installation parameters that may commonly arise if the venting arrangement for the appliance is part of a multi-unit installation. For example, as suggested above, the venting arrangement, instead of directly venting to the exterior of the building, may require duct connections to a master venting structure. In some instances, the manifold installation may comprise a fan-assisted installation. In this case, the purchaser will be asked to provide information regarding the operational characteristics of the fan used in the manifold installation. Further, the manifold module will be configured to calculate duct diameter required to maintain a suitable airflow volume. Since multi-unit installations are commonly done by professional installers, module 16 is contemplated to be configured to meet the needs of such professional installers to account for manifold-specific installation parameters, such as the ones described above, that are commonly encountered in vents for a multi-unit installation. In the event the installation is for a single family dwelling, or once appropriate computational adjustments have been made at module 16, based on manifold-specific installation parameters supplied by the purchaser, then the process continues at block 18. For example, at block 18, the user may be shown a Web page displaying a typical drier installation including samples of turns, at different angles, e.g., 45° turns, 90° degree turns, and straight sections.

At block 20, the purchaser will be prompted to supply vent parameters for the venting arrangement proposed for the appliance of interest. In one exemplary embodiment, the purchaser will be prompted to supply the following vent parameters: dimensions of the venting arrangement, such as the distance from the appliance to the outlet that communicates with the exterior of the house; the number of 90° turns in the venting arrangement; the number of 45° turns in the venting arrangement; dimensions of the outlet cover of the vent; whether the appliance will be installed in a ventilated space, e.g., a room with windows, or in an unventilated space, e.g., a windowless closet.

At blocks 22 and 24, the vent parameters supplied by the purchaser are processed relative to vent requirements data for the appliance of interest to determine a recommendation to the purchaser regarding the suitability of the venting arrangement relative to the appliance of interest. In one exemplary embodiment, the processing may be performed using a look-up table. It is contemplated, however, that the processing could also be performed using an appropriate transfer function or functional relationship, in each case using techniques well-understood by those skilled in the art.

As shown at block 26, depending on whether the equivalent length of the venting arrangement, as determined from the lookup table or functional relationship and based on the vent parameters supplied by the purchaser, is equal to or less than a maximum length for the appliance, then the purchaser would be informed at block 28 that the venting arrangement is acceptable for the appliance of interest. At block 30, the purchaser may be provided with appropriate warnings and installation notes for the appliance of interest. As shown at block 32, in the event the equivalent length of the venting arrangement is within a predefined range (e.g., 10%) above the maximum acceptable venting arrangement length, then as shown at block 34, the purchaser would be informed that the venting arrangement is marginally acceptable. As suggested above, block 36 allows to provide appropriate warning and installation notes to the purchaser. If the equivalent length of the venting arrangement exceeds the marginally-acceptable range for the appliance of interest, then the purchaser would be informed at block 38 that the venting arrangement is not presently acceptable for the appliance of interest. Block 40 allows to recalculate the equivalent length of the venting arrangement based on new vent parameters supplied by the purchaser.

Block 42 allows the purchaser to consider alternative appliance choices or models that would be suitable for a given venting arrangement. For example, as shown at block 52, a searching tool with a drop-down menu could be configured to include a list of additional available models for that appliance including respective hyperlinks for accessing additional details regarding a particular model, e.g., performance capabilities, multi-media presentation, etc. Block 54 may be used to access the look-up table that allows determining the maximum equivalent vent length required by any new appliance choice or model selected by the purchaser. Block 56 allows for determining whether there are any appliance models that would be suitable for the venting arrangement defined by the vent parameters supplied by the purchaser. In case that there are a large number of models suitable for the venting arrangement defined by the purchaser, then block 58 allows for selecting appliance sets of a selectable size that are suitable with the venting arrangement defined by the purchaser. Prior to returning to block 30 via interconnecting node "D", block 60 allows to issue a recommendation including alternative appliance choices that would be suitable for the venting arrangement defined by the purchaser. Block 44 allows the purchaser to receive a recommendation suggesting changes to the venting arrangement that would make that arrangement suitable to the appliance of interest. For example, as shown at block 62, a screen, e.g., a Web page, would be displayed to the purchaser including specific changes that could be made to the venting arrangement in order to meet the venting requirements of the appliance. For example, quantitatively and qualitatively recommendations can be made to shorten the length of the ducts, the number of turns, etc. Prior to returning to block 18 via interconnecting node F (or directly to return step 50), block 64 allows for recalculating the suitability of the appliance of interest to the purchaser based on new vent parameters supplied by the purchaser.

As suggested above, in the event that the venting arrangement was determined to be acceptable, then block 46 allows the vent wizard to issue a document certifying that, based on the specific vent parameters supplied by the purchaser for a given venting arrangement, the arrangement would be suitable for a specific appliance. Prior to return step 50, block 48 allows to transmit the certificate to the purchaser by any suitable communication means, including electronic communication.

Figure 2:
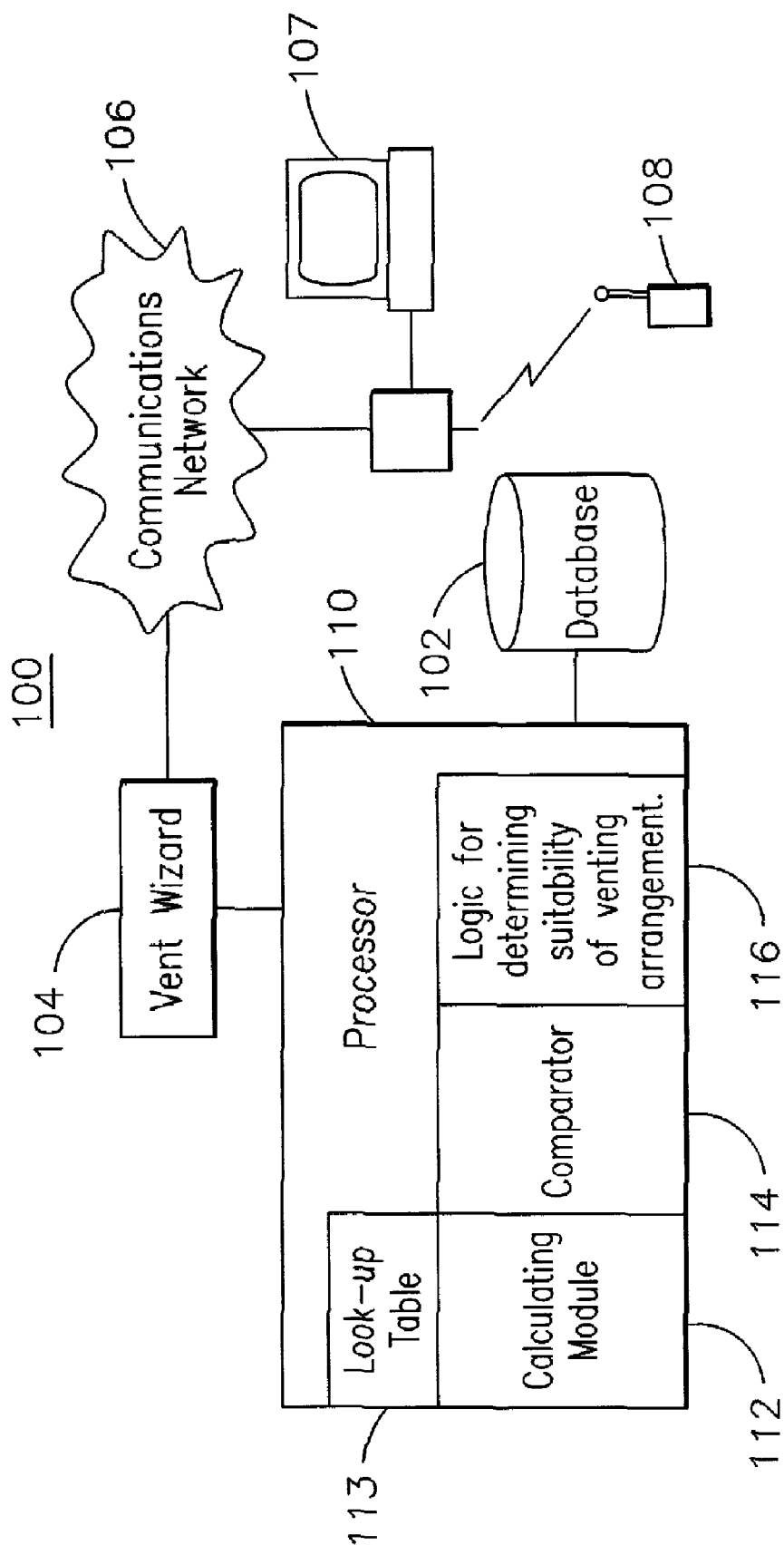
FIG. 2 is a schematic in block diagram form of an exemplary embodiment of a computer-based system that may be used for implementing the actions illustrated in FIG. 1.

FIG. 2 illustrates one exemplary embodiment of a computer-based system 100 for providing guidance to a purchaser for selecting an appliance that generally requires venting. The guidance includes recommendations regarding a venting arrangement for the appliance. The system includes a database 102 configured to store appliance-related information including a respective identifier, such as model number, for each appliance. The appliance-related information further includes venting requirements data for each appliance, e.g., maximum equivalent length of duct required for the venting of that appliance. A vent wizard 104 is configured to provide a set of prompts over a communications network 106 to elicit information from the purchaser regarding a respective appliance of interest to the purchaser, and vent parameters for the venting arrangement for the appliance. For example, a computer terminal 107, personal digital assistant (PDA) 108 or similar communication device, loaded with any suitable commercially-available browser, such as Microsoft Explorer browser, may be used by the purchaser to communicate with the vent wizard 104.

A processor 110 is configured to access the database 102 in view of the information supplied by the purchaser and process the information supplied by the purchaser relative to the vent requirements data for the appliance of interest. This allows determining a recommendation to the purchaser regarding suitability of the venting arrangement relative to the appliance of interest. In one exemplary embodiment, processor 110 may include a calculating module 112 configured to generate air flow data indicative of air flow supportable by the venting arrangement based on the vent parameters supplied by the purchaser. As will be appreciated by those skilled in the art, there may be multiple ways for determining whether a venting arrangement is suitable for the appliance of interest. As suggested above, the determination may be made in terms of equivalent length. However, the determinations could be made in terms of the air speed and/or air flow volume supportable by the venting arrangement relative to the requirements of the appliance of interest. As suggested above, the processor could include a look-up table 113 in lieu or in combination with the calculating module in order to determine whether the venting arrangement is suitable for the appliance of interest. A comparator 114 allows to compare the air flow (or equivalent length) supportable by the venting arrangement relative to air flow (or equivalent length) actually required by the appliance of interest. A logic module 116 allows determining the suitability of the venting arrangement for the appliance of interest based on the results of the comparison performed by comparator 114.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A computer-based method for providing guidance to a purchaser for selecting an appliance that requires venting of air relative to a building structure where the appliance is located, the guidance comprising recommendations that take into account physical constraints regarding an external venting structure relative to the appliance, at least some of said venting structure disposed through said building structure, the method comprising:

providing a database for storing appliance-related information including a respective identifier for each appliance, the appliance-related information further including venting requirements data for each appliance;

configuring a vent wizard to provide a set of prompts over a communications network to elicit information from the purchaser regarding a respective appliance of interest to the purchaser, and vent parameters indicative of the physical constraints for the venting structure for the appliance;

accessing the database in view of the information supplied by the purchaser;

processing the information supplied by the purchaser relative to the vent requirements data for the appliance of interest to determine a recommendation to the purchaser regarding suitability of the external venting structure relative to the appliance of interest, wherein the recommendation is selected from at least one of the following: 1) indicating changes to be made to the external venting structure that would make the external venting structure suitable for meeting the air flow requirements of the appliance interest; and 2) indicating to the purchaser whether or not the external venting structure presently meets one of a plurality of predefined air flow ranges relative to the appliance of interest, each of said air flow ranges indicative of a predefined distinct condition of venting for the appliance of interest; and transmitting the recommendation to the purchaser so that appropriate action may be taken by the purchaser regarding the selection of the appliance and/or venting structure.

2. The computer-based method of claim 1 wherein the processing of the information supplied by the purchaser relative to the vent requirements data comprises:

generating air flow data indicative of air flow supportable by the venting structure based on the vent parameters supplied by the purchaser;

comparing the air flow supportable by the venting structure relative to air flow actually required by the appliance of interest; and determining the suitability of the venting structure for the appliance of interest based on the results of the comparison.

3. The computer-based method of claim 1 wherein the predefined distinct condition of venting for the appliance of interest is selected from the group consisting of a fully acceptable venting condition, a marginally acceptable venting condition, and an unacceptable venting condition.

4. The computer-based method of claim 1 wherein the recommendation comprises indicating to the purchaser that the venting structure, based on the vent parameters supplied by the purchaser, is unsuitable to the appliance of interest, and further comprises indicating to the purchaser alternative appliance choices that would be suitable for the venting structure.

5. The computer-based method of claim 1 wherein the vent parameters are selected from the group consisting of length of the vent, number of turns along the vent, turn angle, and dimensions of a vent outlet cover.

6. The computer-based method of claim 1 further comprising issuing a document certifying that the venting structure, based on the vent parameters supplied by the purchaser, is within a predefined acceptable range relative to at least one model for the appliance of interest.

7. The computer-based method of claim 1 wherein the appliance is selected from the group consisting of a drier, a range hood, and exhaust fan.

8. A computer-based system for providing guidance to a purchaser for selecting an appliance that requires venting of air relative to a building structure where the appliance is located, the guidance comprising recommendations that take into account physical constraints regarding an external venting structure relative to the appliance, at least some of said venting structure disposed through said building structure, the system comprising:

a database for storing appliance-related information including a respective identifier for each appliance, the appliance-related information further including venting requirements data for each appliance;

a vent wizard configured to provide a set of prompts over a communications network to elicit information from the purchaser regarding a respective appliance of interest to the purchaser, and vent parameters indicative of the physical constraints for the venting structure for the appliance; and a processor configured to access the database in view of the information supplied by the purchaser and process the information supplied by the purchaser relative to the vent requirements data for the appliance of interest to determine a recommendation to the purchaser regarding suitability of the external venting structure relative to the appliance of interest, wherein the recommendation is selected from at least one of the following: 1) indicating changes to be made to the external venting structure that would make the external structure suitable for meeting the air flow requirements of the appliance of interest; and 2) indicating to the purchaser whether or not the external venting structure presently meets one of a plurality of predefined air flow ranges relative to the appliance of interest, each of said air flow ranges indicative of a predefined distinct condition of venting for the appliance of interest.

9. The computer-based system of claim 8 wherein the processor configured to process the information supplied by the purchaser relative to the vent requirements data comprises:

a calculating module configured to calculate air flow data indicative of air flow supportable by the venting structure based on the vent parameters supplied by the purchaser;

a comparator configured to compare the air flow supportable by the venting structure relative to air flow actually required by the appliance of interest; and a module configured to determine the suitability of the venting structure for the appliance of interest based on the results of the comparison.

10. The computer-based system of claim 8 wherein the predefined distinct condition of venting for the appliance of interest is selected from the group consisting of a fully acceptable venting condition, a marginally acceptable venting condition, and an unacceptable venting condition.

11. The computer-based system of claim 8 wherein the recommendation comprises indicating to the purchaser that the venting structure, based on the vent parameters supplied by the purchaser, is unsuitable to the appliance of interest, and further comprises indicating to the purchaser alternative appliance choices that would be suitable for the venting structure.

12. The computer-based system of claim 8 wherein the vent parameters are selected from the group consisting of length of the vent, number of turns along the vent, turn angle, and dimensions of a vent outlet cover.

13. The computer-based system of claim 8 further comprising a certifying module configured to issue a document certifying that the venting structure, based on the vent parameters supplied by the purchaser, is acceptable relative to at least one model for the appliance of interest.

14. The computer-based system of claim 8 wherein the appliance is selected from the group consisting of a drier, a range hood, and exhaust fan.

15. The system of claim 8 further comprising a module configured to communicate the recommendation to the purchaser regarding the selection of the appliance and/or venting structure.

* * * * *